(No Model.)  2 Sheets—Sheet 1.

L. G. WOOLLEY.
TREADLE.

No. 398,363.  Patented Feb. 19, 1889.

Fig. I.

WITNESSES:
L. L. Burket.
Edm. P. Ellis.

INVENTOR.
L. G. Woolley.
BY
F. A. Lehmann,
ATTORNEY (No Model.) 2 Sheets—Sheet 2.

L. G. WOOLLEY.
TREADLE.

No. 398,363. Patented Feb. 19, 1889.

Witnesses.
Edm. P. Ellis.
L. L. Burket.

Inventor
L. G. Woolley,
per J. A. Lehmann,
Atty

UNITED STATES PATENT OFFICE.

LEONIDAS G. WOOLLEY, OF GRAND RAPIDS, MICHIGAN.

TREADLE.

SPECIFICATION forming part of Letters Patent No. 398,363, dated February 19, 1889.

Application filed July 18, 1888. Serial No. 280,280. (No model.)

*To all whom it may concern:*

Be it known that I, LEONIDAS G. WOOLLEY, of Grand Rapids, in the county of Kent and State of Michigan, have invented certain new and useful Improvements in Treadles; and I do hereby declare the following to be a full, clear, and exact description of the invention, such as will enable others skilled in the art to which it pertains to make and use it, reference being had to the accompanying drawings, which form part of this specification.

My invention relates to an improvement in treadles; and it consists in the combination of two driving-shafts, each one of which is provided with a gear-wheel secured centrally thereon and a crank upon each of its ends, with two treadles which are mounted upon the cranks, a driven shaft provided with a pinion which meshes with and is driven by the two gear-wheels, and a band-wheel which is secured upon the driven shaft, as will be more fully described hereinafter.

The object of my invention is to provide a treadle for sewing-machines and light machinery of all kinds, and in which the parts are so constructed that the heel-and-toe movement of the ordinary treadle is done away with, the feet are kept upon a level, and are given a back-and-forth motion, thus doing away with all the evil effects of the common treadle.

Figure 1:
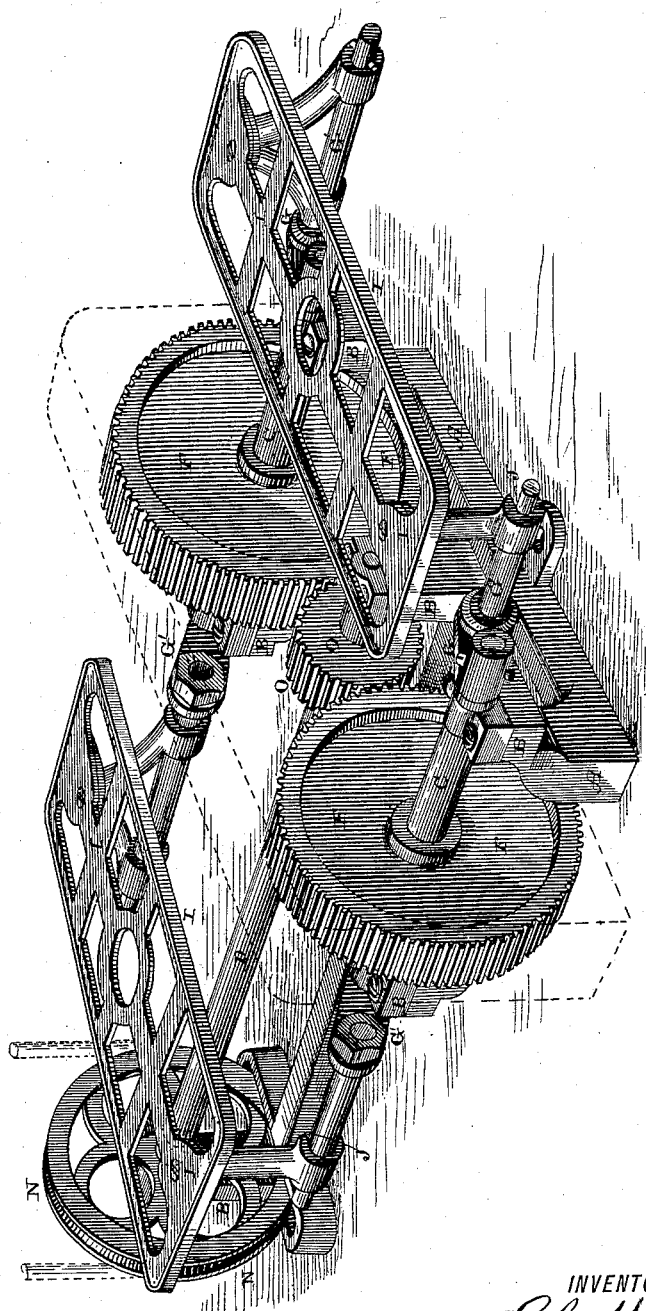
Figure 2:
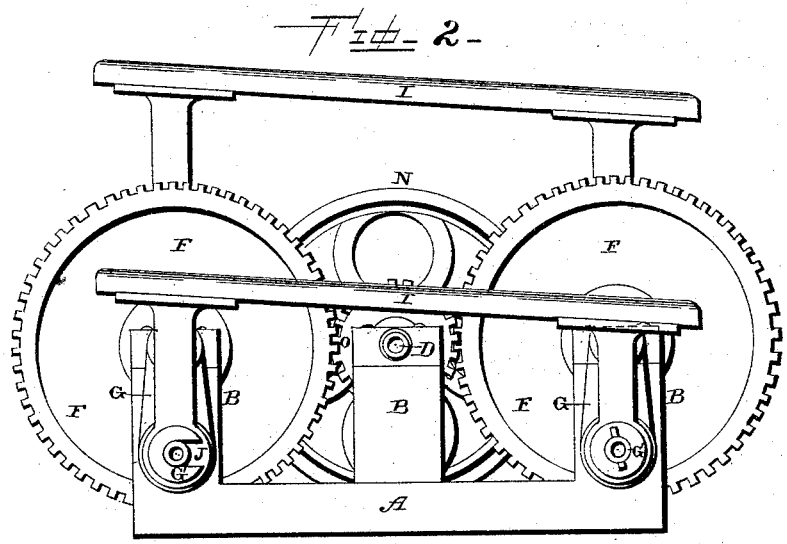
Figure 3:
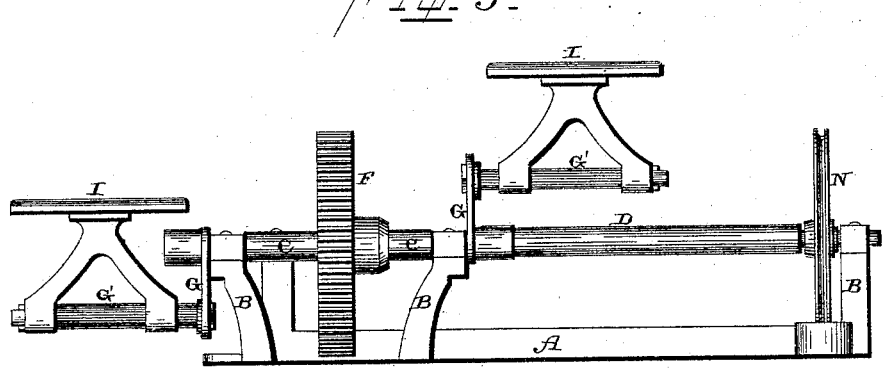

Figure 1 is a perspective of a treadle embodying my invention complete. Fig. 2 is an end elevation. Fig. 3 is a side elevation of the same.

A represents a suitable metallic frame, of any suitable construction, and which is provided with two bearings, B, for each one of the three shafts C C D employed. The two shafts C C are made of any suitable length, and are provided at their centers with the gear-wheels F, of any desired size. Each one of these shafts is provided with cranks G upon its ends, the crank upon one end being set at a right angle to the crank upon the other end. These cranks form long bearings G', and upon these bearings the treadles I are placed. The treadles are provided with suitable bearings, through which the cranks pass, and are raised any suitable distance above the cranks, so as to pass over the ends of the shafts C and the top of the shaft D as the shafts C revolve. Each treadle being supported upon two cranks, as the shafts C revolve, the treadles are made to move through substantially an ellipse, and the feet are given a back-and-forth movement, instead of a rocking movement, as upon the ordinary treadle. The cranks of one treadle being set at an angle to those of the other treadle, no dead-center is formed, and the treadles can be started in motion from any position in which they happen to be. In order to compensate for any irregularity in the arrangement or construction of the cranks, one of the bearings of each of the treadles is cut away upon one side, as shown at J, so that as the crank moves forward they will not bind upon them at this point. There being an opening, J, cut in the side of the bearings, as shown, the front edge of the crank extends into this cut or opening, and having a slight play, in case of any irregularity in construction or arrangement of parts, no binding can possibly occur, and hence absolutely fine workmanship, such as would otherwise be required, is not necessary.

The driven shaft D is provided with a band-wheel, N, at its outer end, and with a pinion, O, at its inner end, which meshes with the two gear-wheels and transmits the motion of the gear-wheels to the driven shaft, and through the band-wheel N to the machinery which is being driven. This pinion, being placed between the two gear-wheels, serves not only to transmit their motion to the driven shaft, but also serves to keep the two gear-wheels in absolute unison with each other regardless of the position of the cranks. This pinion, being made much smaller than the gear-wheels, imparts to the driven shaft a very rapid movement, so that the sewing or other machine being driven can be given a very rapid motion. By the use of three shafts geared together, as here shown, all pitmen and fly-wheels are entirely done away with and all the difficulties attending dead-centers are entirely obviated.

The great trouble with the ordinary pivoted treadles consists in their ends having a vertical play, which causes first the heels and then the toes of the operator to be depressed, and thus bring an unnatural and injurious strain to bear not only upon the ankles, but through the entire lower portion of the body, causing in female operators a train of unpleasant symptoms and diseases peculiar to her sex. By the construction here shown all pivoted movements are done away with and the feet are made to move back and forth, making the movement much less tiresome and injurious to the operator. The two treadles being balanced by each other and always having the same movement at the same time, the machinery can be driven much more readily and easily and a much greater power can be applied than can be done with the ordinary pivoted treadle. As a suitable stop—such as is employed in connection with sewing-machines—is used with the band-wheel, the machine can never run backward, and, there being no dead-centers, it is never necessary to start the machine with the hand, as is the case with the ordinary fly-wheel and pitman. The three wheels are covered by a light casing, which serves both to protect the operator's dress and to prevent the wheels from becoming clogged by having articles falling upon them.

Having thus described my invention, I claim—

1. The combination of two parallel shafts provided with cranks at each of their ends, two treadles, each one connected to the two cranks at one end of the two shafts, gear-wheels secured to the two shafts, a driven shaft, and a wheel secured to the driven shaft, and which meshes with the two gear-wheels, substantially as shown.

2. The combination of two driving-shafts provided with cranks set at different angles, two treadles mounted upon the four cranks, gear-wheels attached to the driving-shafts, and a driven shaft provided with a pinion which meshes with both of the gear-wheels, substantially as described.

3. The combination of a suitable framework provided with suitable bearings, the two driving-shafts C and the driven shaft D, the cranks secured to the ends of the two driving-shafts, the treadles which are mounted upon these cranks, the pinion secured to the driven shaft and meshing with the two gear-wheels, and a band-wheel secured to the driven shaft, substantially as specified.

4. The combination of the driving-shafts, cranks secured thereto, and the treadles provided with bearings through which the cranks pass, the bearings of the treadles being cut away, as shown at J, substantially as set forth.

In testimony whereof I affix my signature in presence of two witnesses.

LEONIDAS G. WOOLLEY.

Witnesses:
PHILIP MAURO,
F. A. LEHMANN.